(12) United States Patent
Kamiya

(10) Patent No.: US 12,731,163 B2
(45) Date of Patent: Sep. 8, 2026

(54) CODE AUTHENTICATION SYSTEM AND NON-TRANSITORY COMPUTER READABLE STORAGE MEDIUM

(71) Applicant: DENSO WAVE INCORPORATED, Chita-gun (JP)

(72) Inventor: Takayoshi Kamiya, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 18/788,718

(22) Filed: Jul. 30, 2024

(65) Prior Publication Data

US 2024/0386448 A1 Nov. 21, 2024

Related U.S. Application Data

(63) Continuation of application No. PCT/JP2023/011926, filed on Mar. 24, 2023.

(30) Foreign Application Priority Data

Apr. 28, 2022 (JP) ................................ 2022-075080

(51) Int. Cl.
*G06Q 30/018* (2023.01)
*G06K 19/06* (2006.01)
*G06T 7/73* (2017.01)

(52) U.S. Cl.
CPC ... *G06Q 30/0185* (2013.01); *G06K 19/06037* (2013.01); *G06T 7/73* (2017.01)

(58) Field of Classification Search
CPC ................................................ G06Q 30/0185
See application file for complete search history.

(56) References Cited

U.S. PATENT DOCUMENTS

| | | | | |
|---|---|---|---|---|
| 9,069,069 | B2 * | 6/2015 | Freund | G06F 21/30 |
| 10,083,371 | B2 * | 9/2018 | Ebata | G06T 7/001 |
| 2002/0067857 | A1 * | 6/2002 | Hartmann | G06F 16/5838 707/E17.023 |
| 2009/0080760 | A1 * | 3/2009 | Knysh | B42D 25/41 382/141 |
| 2011/0259962 | A1 * | 10/2011 | Picard | G06K 19/06037 235/462.11 |
| 2013/0070973 | A1 * | 3/2013 | Saito | G06V 10/993 382/118 |

(Continued)

FOREIGN PATENT DOCUMENTS

| | | | | |
|---|---|---|---|---|
| FR | 3129760 A1 * | 6/2023 | | G06V 30/224 |
| JP | S58203577 A * | 11/1983 | | |

(Continued)

*Primary Examiner* — Ilana L Spar
*Assistant Examiner* — Melinda Gieringer
(74) *Attorney, Agent, or Firm* — Oliff PLC

(57) ABSTRACT

A code image is acquired by photographing a code as an authentication target. An extraction area is set within an area of the code shown in the code image. An image feature extracted from the extraction area is acquired as an extraction image feature. The image feature extracted from the extraction area of the code which is a genuine product is prepared and registered in advance as a registration image feature. An authenticity of the code as the authentication target is determined based on a verification between the extraction image feature and the registration image feature.

8 Claims, 7 Drawing Sheets

(56) References Cited

U.S. PATENT DOCUMENTS

2013/0114102 A1* 5/2013 Yamamoto ........... G06V 10/245
358/1.14
2014/0153831 A1 6/2014 Ishiyama
2014/0285855 A1* 9/2014 Capobianco ....... H04N 1/32352
358/3.28
2015/0178521 A1* 6/2015 Ching ...................... G06K 5/00
235/375
2017/0200035 A1 7/2017 Teraura
2018/0082157 A1 3/2018 Ishiyama
2018/0178579 A1* 6/2018 Chen ...................... B42D 25/30
2019/0018994 A1* 1/2019 Teraura .............. G06K 19/0614
2020/0012907 A1 1/2020 Ishiyama
2020/0057910 A1* 2/2020 Aoki .................... G06V 10/757
2021/0034930 A1 2/2021 Ishiyama
2023/0049798 A1 2/2023 Mizui et al.

FOREIGN PATENT DOCUMENTS

JP 2021-174439 A 11/2021
JP 2021-174440 A 11/2021
JP 2021-174441 A 11/2021
JP 2021-174442 A 11/2021

* cited by examiner

100
AUTHEN SERVER
PROC CIR
DAT REGIST U
DAT PROV U
PROCOR
RAM
STOR U
30
30a
31
32
33
41
42
FEAT AM DB
40
REGIST TERM
10
10a
PROC CIR
IM ACQ U
CODE READ U
FEAT EXTRACT U
PROCOR
RAM
STOR U
11
12
13
21
22
23
CAM
DISP
COM U
16
17
18
CDr, CD
VERIF TERM
60
60a
PROC CIR
IM ACQ U
CODE READ U
FEAT EXTRACT U
REGIST FEAT PREP U
CODE DET U
PROCOR
RAM
STOR U
61
62
63
71
72
73
74
75
CAM
DISP
COM U
66
67
68
CDs, CD

200
AUTHEN SERVER
30
PROC CIR
30a
DAT REGIST U
DAT PROV U
FEAT EXTRACT U
DAT REGIST U
271
272
273
41
REGIST FEAT PREP U
CODE DET U
DAT PROV U
274
275
42
PROCOR
RAM
STOR U
31
32
33
FEAT AM DB
40
CDs, CD
VERIF TERM
60
CAM
DISP
COM U
66
67
68
PROC CIR
CDr, CD
REGIST TERM
10
CAM
DISP
COM U
16
17
18
PROC CIR

CODE AUTHENTICATION SYSTEM AND NON-TRANSITORY COMPUTER READABLE STORAGE MEDIUM

CROSS REFERENCE TO RELATED APPLICATION

The present application is a continuation application of International Patent Application No. PCT/JP2023/011926 filed on Mar. 24, 2023, which designated the U.S. and claims the benefit of priority from Japanese Patent Application No. 2022-075080 filed on Apr. 28, 2022. The entire disclosures of all of the above applications are incorporated herein by reference.

TECHNICAL FIELD

The present disclosure of this specification relates to a code authentication technique for determining the authenticity of a code.

BACKGROUND

In the product verification and search system according to a conceivable technique, a reference part of the product that is common to all products, such as a logo and the product number, is detected from an image of a genuine product, and the surface pattern and the small irregularity of the verification area based on the reference part as a standard are stored as an image feature. In such a verification and search system, the image feature in a verification area based on a reference part as the standard is extracted from the captured image of the product as the verification target, and the authenticity of the product as the verification target can be determined by verifying the image feature with the stored image feature.

SUMMARY

According to an example, a code image is acquired by photographing a code as an authentication target. An extraction area is set within an area of the code shown in the code image. An image feature extracted from the extraction area is acquired as an extraction image feature. The image feature extracted from the extraction area of the code which is a genuine product is prepared and registered in advance as a registration image feature. An authenticity of the code as the authentication target is determined based on a verification between the extraction image feature and the registration image feature.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
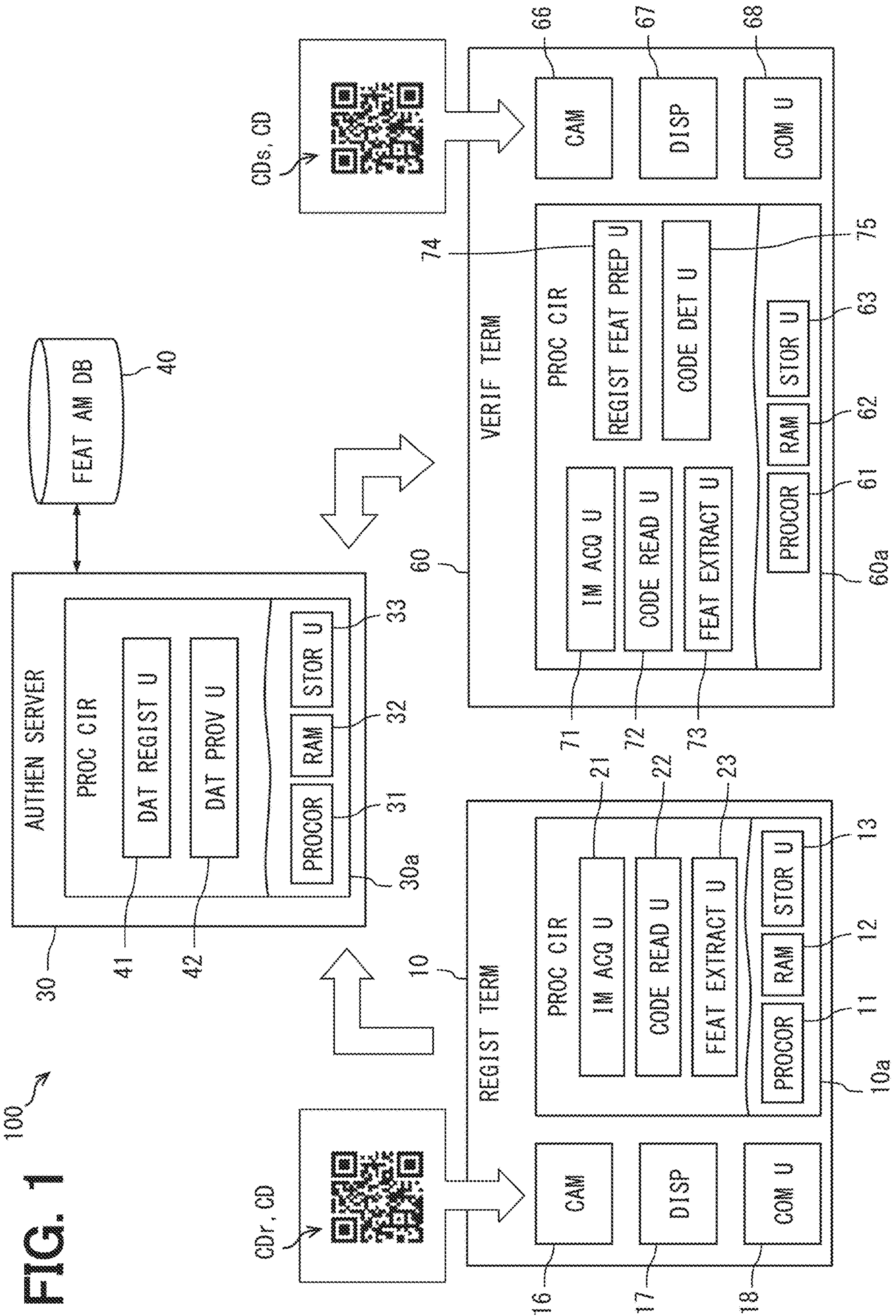
FIG. 1 is a diagram showing an overall view of a code authentication system according to a first embodiment.

In the verification and search system according to the conceivable technique, it may be difficult to set the shooting direction, the shooting size and the like of the image of the product as the verification target to be the same as the image of the genuine product used when storing the image feature. Therefore, in the process of extracting the image feature from an image of a product as the verification target, a pre-processing such as normalization is applied to the image of the verification area based on the position and the orientation of the reference part.

However, the verification area is set at a position spaced apart from the reference part. In addition, the reference part such as the logo and the product number may not often have a shape that is suitable for use in the pre-processing. Therefore, in the product verification system according to the conceivable technique, it may become difficult to correctly extract the image feature from each of the images of the verification target and the genuine product, so that it is difficult to ensure the accuracy of the determination.

The present embodiments provide a code authentication system and a code authentication program capable of ensuring determination accuracy.

In order to achieve the above object, according to one aspect of the present embodiments, a code authentication system includes:

- an image acquisition unit that acquires a code image acquired by photographing a code as an authentication target;
- a feature extraction unit that sets an extraction area within an area of the code shown in the code image and acquires an image feature extracted from the extraction area as an extraction image feature;
- a registration feature preparation unit that prepares an image feature extracted from an extraction area of a code in a genuine product and registered in advance as a registration image feature; and
- a code determination unit that determines an authenticity of the code as the authentication target based on a comparison between the extraction image feature and the registration image feature.

Further, according to another aspect of the present embodiments, a code authentication program causes at least one processor to execute a process including:

- acquiring a code image acquired by photographing a code as an authentication target;
- setting an extraction area within an area of the code shown in the code image;
- acquiring an image feature extracted from the extraction area as an extraction image feature;
- preparing an image feature extracted from an extraction area of a code in a genuine product and registered in advance as a registration image feature; and
- determining an authenticity of the code as the authentication target based on a comparison between the extraction image feature and the registration image feature.

In these aspects, the extraction area from which the image feature is extracted is set within the region of the code shown in the code image. In addition, the code has a shape to be suitable for an application of the pre-processing, for example by including a straight section and a right angle corner. According to the above, it becomes easier to correctly extract the image feature from each code image of the authentication target and the genuine product, so that the accuracy of authenticity determination can be ensured.

Hereinafter, a plurality of embodiments of the present disclosure will be described with reference to the drawings. Duplicate description may be omitted by assigning the same reference numerals to the corresponding components in each embodiment. When only a part of the configuration is described in each embodiment, the configurations of the other embodiments described above can be applied to the other parts of the configuration. Not only the combinations of the configurations explicitly illustrated in the description of each embodiment, but also the configurations of multiple embodiments can be partially combined even when they are not explicitly illustrated when there is no problem in the combination in particular. Combinations of the embodiments and modifications that are not explicitly described are also deemed to be disclosed by the present disclosure.

First Embodiment

A code authentication system 100 according to a first embodiment of the present disclosure shown in FIG. 1 authenticates a one-dimensional code or a two-dimensional code (hereinafter, a code CD) as an authentication target by using an individual authentication technique. Specifically, the code authentication system 100 determines whether the code CD as the authentication target is identical with the code CD of the genuine product which is preliminarily registered, using a feature of the surface pattern of the code CD such as a printing irregularity, a fine scratch, and a dent.

The code CD may be attached to the product in the form of a label printed on a paper medium or the like, or may be directly marked on the product by printing, engraving, branding, or the like. The product linked to the code CD may be various products such as industrial products, agricultural products, and marine products, and may not be limited to a specific tangible object. One type of code CD may be linked to multiple products of the same type, or may be linked to only one product. That is, the code CD corresponding to the genuine product may be issued only once, or may exist in a predetermined number.

As an example, the code authentication system 100 determines the authenticity of a QR code (registered trademark, see also FIGS. 2 and 3), which is one type of two-dimensional code. The QR code includes a large number of white cells CeW and a large number of black cells CeB formed in a rectangular (or square) shape. The QR code records information by a two-dimensional arrangement of white cells CeW and black cells CeB.

The white cell CeW may not be strictly white, alternatively, the white cell CeW may be a light-colore cell with a color that has a brightness higher than the black cell CeB. In the white cell CeW, the base surface of the medium or the product on which the QR code is formed is exposed. The black cell CeB may not be strictly black, alternatively, the black cell CeB may be a dark cell with a color that has a brightness lower than the white cell CeW. The black cell CeB is colored with the ink used to print the QR code.

Figure 2:
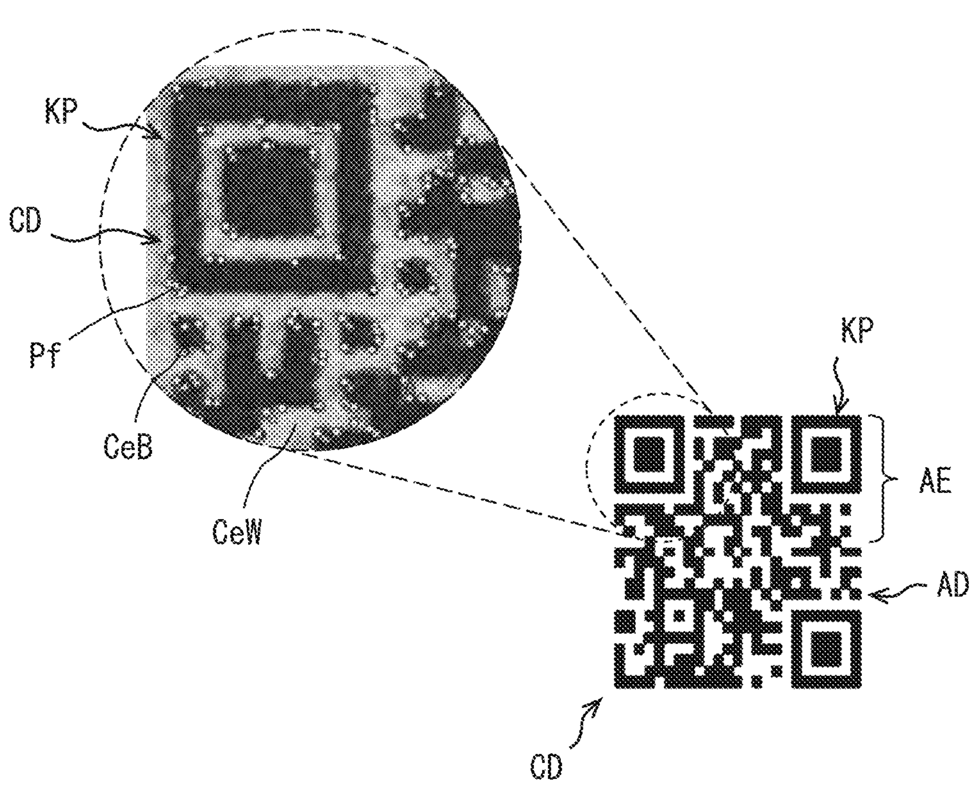
FIG. 2 is a diagram showing an example of an extraction area set in a two-dimensional code.
Figure 3:
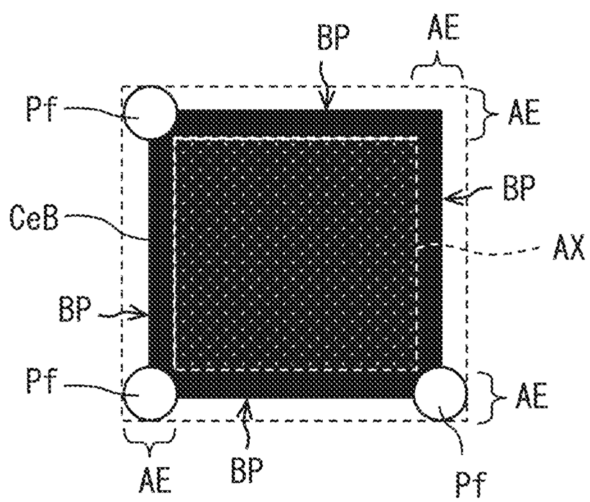
FIG. 3 is a diagram for explaining details of an extraction area.

In the QR code, a fixed pattern KP and a data area AD are formed by an arrangement of white cells CeW and black cells CeB (see FIG. 2). Specifically, a finder pattern (i.e., a cut-out symbol), an alignment pattern, a timing pattern, a margin area and the like are formed as the fixed pattern KP.

The data area AD is the area of the QR code excluding the fixed pattern KP. The data area AD includes a storage area in which the data itself is stored, and a correction area in which an error correction code used to restore the data is stored. The data area AD includes, in addition to the code CD and identification information for identifying the product, information related to the product, specifically, management information such as the product's production factory, the manufacturer's name, raw materials, the lot number, the production date, and the shipping date. In the following description, the QR code handled by the code authentication system 100 will simply be referred to as a "code CD."

The code authentication system 100 includes a registration terminal 10, an authentication server 30, a verification terminal 60, and the like. The registration terminal 10, the authentication server 30, and the verification terminal 60 are each connected to a network and are capable of communicating with each other.

The registration terminal 10 is a device that uploads information about a code CD (hereinafter, referred to as a master code CDr) that is a genuine product to the authentication server 30. A plurality (or, a large number) of registration terminals 10 can provide the information of the master code CDr to a single authentication server 30 via the network. The registration terminal 10 is operated by a code output supplier who outputs the master code CDr as a tangible object. For example, the code output supplier may include a producer involved in the production of the product, a distribution manager involved in the distribution of the product, a recycler involved in the recycling of the product and the like. The registration terminal 10 may be a general-purpose device such as a smartphone or a tablet terminal, or may be a reading device dedicated to reading code CDs. Furthermore, the registration terminal 10 may be a fixed reading device installed on a conveyor line or the like.

Figure 4:
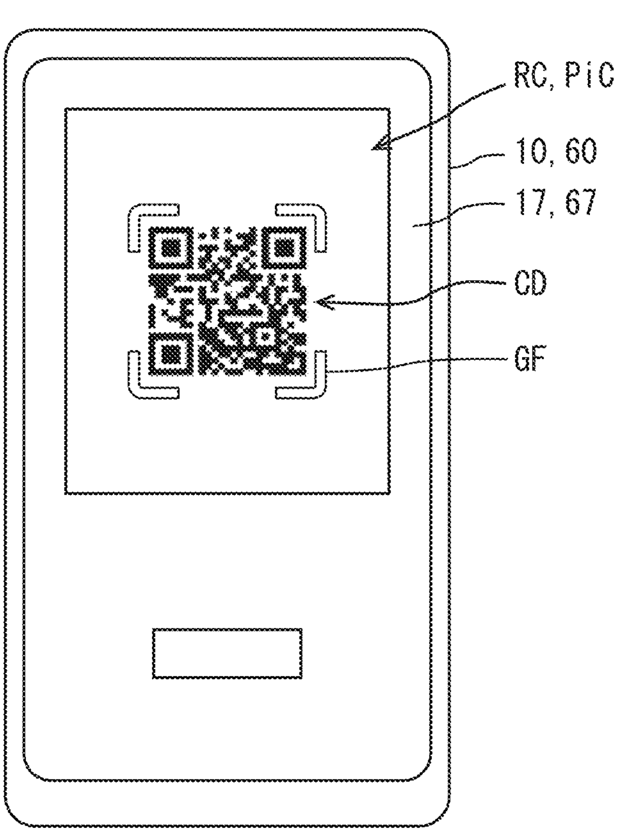
FIG. 4 is a diagram showing an example of a reading screen displayed on a registration terminal and a verification terminal.

The registration terminal 10 includes a camera 16, a display 17, a communication unit 18, and a processing circuit 10*a* electrically connected to these. The camera 16 is a photographing unit that photographs an image including a code CD formed on a medium or a product (hereinafter, referred to as a code image PiC, see FIG. 4). The display 17 is a display device provided in the registration terminal 10. The display on the display 17 is controlled by the processing circuit 10*a*. When the registration terminal 10 is a fixed reading device, the configuration corresponding to the display 17 may be omitted.

The terminal communication unit 18 is configured to perform a moving body communication conforming the wide area wireless communication standards such as LTE and 5G or the communication standards such as Wi-Fi (registered trademark). The communication unit 18 connects the registration terminal 10 to a network, enabling transmission and reception of information between the processing circuit 10*a* and the authentication server 30 via the network.

The processing circuit 10*a* includes a processor 11, a RAM (i.e., Random Access Memory) 12, a storage unit 13, an input/output interface, and a bus connecting these, and functions as a computer that performs calculation processing. The processor 11 is hardware for calculation processing coupled with the RAM 12. The storage unit 13 stores an application program related to the registration of information on the code CD (hereinafter, referred to as an information registration application).

The information registration application is provided, for example, by a system administrator who manages the code authentication system 100 or a system vendor that provides the code authentication system 100, and is installed in the registration terminal 10. When the processor 11 executes the information registration application, a feature registration process (see FIG. 6) starts. The processing circuit 10*a* includes an image acquisition unit 21, a code read unit 22, a feature extraction unit 23, and the like, which function as functional units for performing a feature registration process in cooperation with a data registration unit 41, which will be described later.

The image acquisition unit 21 acquires image data of a captured image photographed by the camera 16. The image acquisition unit 21 acquires a code image PiC that is a copy of an original code CD that is clearly a genuine product (at S11). When the code image PiC is acquired, the reading screen RS (see FIG. 4) is displayed on the display 17.

An image photographed by the camera 16 is displayed in real time on the reading screen RS. In addition, a rectangular frame image GF is superimposed on the image on the reading screen RS. The frame image GF is an image portion for guiding the photographer of the code CD so that the code CD is positioned within the frame. When the photographer holding the registration terminal 10 places the code CD within the frame image GF, a code image PiC for photographing the code CD is automatically or manually stored.

The image acquisition unit 21 searches for each finder pattern from the photographed code image PiC, and specifies the position of the code CD (i.e., the master code CDr) shown in the code image PiC (at S12). Furthermore, the image acquisition unit 21 specifies the rotation angle (i.e., the posture) and the like of the code CD shown in the code image PiC from the shape and positional relationship of each finder pattern.

The image acquisition unit 21 applies the pre-processing such as normalization or standardization to the area where the code CD is shown based on the information on the position and the orientation of the code CD grasped based on the finder pattern (at S13). The image acquisition unit 21 applies the pre-processing to prepare a processed image (hereinafter, an extraction image) suitable for extracting a feature amount, which will be described later. The extraction image is an image corrected to have a shape obtained by photographing the code CD from the front. In the extraction image, the gradation value of the entire code CD is adjusted so that the gradation values of the white cells CeW and the black cells CeB are approximately the same value.

The code reading unit 22 reads out the information stored on the code CD from the data area AD of the code CD shown in the code image PiC (at S14). The code reading unit 22 may read the stored information of the code CD from the code image PiC before the application of pre-processing, or may read the stored information of the code CD from the extraction image after the application of pre-processing. The code reading unit 22 acquires at least unique identification information for identifying the photographed master code CDr by reading the storage information. Furthermore, when area information, which will be described later, is written in the data area AD, the code reading unit 22 acquires the area information by reading the area information.

The feature extraction unit 23 sets an extraction area AE within the area of the master code CDr shown in the code image PiC (at S15). The extraction area AE is a range which is the extraction target of the image feature, and is set in at least a part of the extraction image. The range set in the extraction area AE may be predefined based on standards or the like, or may be defined by settings inputted into the registration terminal 10. Furthermore, the area information defining the extraction area AE may be stored on the code CD. In this embodiment, the feature extraction unit 23 sets the extraction area AE based on the area information read by the code reading unit 22. Furthermore, the feature extraction unit 23 may determine the state of the extraction image and automatically set the range of the extraction area AE. In this case, the feature extraction unit 23 generates the area information.

As an example, the feature extraction unit 23 sets a half of the area of the code CD including the two finder patterns (i.e., the upper half of the area in FIG. 2) as the extraction area AE. The extraction area AE includes both the storage area and the correction area of the data area AD. Furthermore, the feature extraction unit 23 uses only the black cells CeB among the white cells CeW and the black cells CeB in the extraction area AE, as an extraction target for extracting the image feature. When the code CD is formed by printing, the feature extraction unit 23 sets an outer portion BP facing the white cell CeW within the formation range of the black cell CeB as the extraction target. The feature extraction unit 23 captures, as a feature, the ink bleeding that occurs on the contour of the black cell CeB when the code CD is printed. On the other hand, the feature extraction unit 23 excludes the inner portion AX, excluding the outer portion BP, of the formation range of the black cell CeB from the extraction area AE (see the dotted range in FIG. 3). For example, if the black cell CeB is square, about a half of the area of the black cell CeB is excluded from the extraction area AE as the inner portion AX. As a result of the above, the extraction area AE is narrowed down to a band-shaped area that is a half of the range of the code CD and that is along the boundary between the black cells CeB and the white cells CeW.

The feature extraction unit 23 extracts the image feature from the set extraction area AE and acquires the image feature as the registration image feature (at S16). Specifically, the feature extraction unit 23 sets a large number of feature points Pf (see FIGS. 2 and 3) in the outer portion BP of the black cell CeB within the extraction area AE. The feature points Pf are set, in addition to at the corners and outer edges of the black cells CeB, at the locations where the bleeding and scratches described above occur. The feature extraction unit 23 sets the arrangement of the feature points Pf in the extraction area AE as the image feature of the extraction area AE. The registration image feature extracted by the feature extraction unit 23 is transmitted to the authentication server 30 by the communication unit 18 together with a request to register the registration image feature (at S17). In the registration request, the identification information read by the code reading unit 22 and the area information defining the range of the extraction area AE are transmitted to the authentication server 30 together with the registration image feature. In addition, if the extraction area AE is predefined by a standard or the like, and the area information is stored on the code CD, transmission of the area information may be omitted.

The authentication server 30 accumulates information on the registration image feature transmitted from the registration terminal 10 together with the registration request in a feature amount database (hereinafter, referred to as a feature amount DB) 40. When the authentication server 30 receives a request for providing the registration image feature from the verification terminal 60, the authentication server 30 provides the information on the registration image feature stored in the feature amount DB 40 to the verification terminal 60 which is the transmission source of the provision request. The authentication server 30 is operated by, for example, the above-described system administrator, the system vendor, or a public institution.

The authentication server 30 may be an on-premise server device that is physically managed by an administrator or the like, or may be a virtual configuration provided on the cloud. Similarly, the feature DB 40 may be a storage area provided in an on-premise server device, or may be a storage area provided in a virtual file server provided on the cloud. Furthermore, the authentication server 30 and the feature DB 40 may be integrated into one unit.

The authentication server 30 is an information processing device mainly including a processing circuit 30*a*. The processing circuit 30*a* includes a processor 31, a RAM 32, a storage unit 33, an input/output interface, and a bus connecting these. When the processor 31 executes the programs stored in the memory unit 33, functional units such as a data registration unit 41 and a data provision unit 42 are constructed in the processing circuit 30*a*.

The data registration unit 41 accepts a request to register a registration image feature transmitted from the registration terminal 10. Upon receiving the registration request, the data registration unit 41 acquires the identification information of the master code CDr, the registration image feature, and the area information. The data registration unit 41 registers the identification information and the area information in the feature DB 40 in association with the identification information (at S17). When only one master code CDr is issued, one piece of identification information is associated with one registration image feature. On the other hand, when a plurality of master codes CDr are issued, the same number of the registration image features as the number of issued master codes CDr are linked to one piece of identification information and stored.

The data provision unit 42 accepts a request for providing the registration image feature transmitted from the verification terminal 60. Upon receiving the request for provision, the data provision unit 42 acquires the identification information of the code CD as the search target and the provision target (hereinafter, a target code CDs). The data provision unit 42 searches for the registration image feature linked to the acquired identification information from among a large number of registration image features that are registered in advance in the feature amount DB 40 in a state linked to each individual identification information. When the area information is linked to the identification information or the registration image feature, the data provision unit 42 acquires the area information together with the registration image feature. The data provision unit 42 transmits the registration image feature and the area information acquired by the search to the verification terminal 60 which is the transmission source of the request for provision. When a plurality of registration image features are linked to the identification information, the data provision unit 42 transmits all of the registration image features to the verification terminal 60.

The verification terminal 60 is a device that reads the target code CDs as the authentication target and verifies the target code CDs. The verification terminal 60 is connected to the authentication server 30 via a network, and transmits to the authentication server 30 the request for providing information used in verifying the target code CDs. The verification terminal 60 is a general-purpose device such as a smartphone or a tablet terminal. The verification terminal 60 can be used by retailers, end users, and the like in addition to the above-described producers, distribution managers, and recyclers. The verification terminal 60 may be a dedicated reading device for reading the code CD, or a fixed reading device.

The verification terminal 60 includes a camera 66, a display 67, a communication unit 68, and a processing circuit 60*a* electrically connected to these. The camera 66, the display 67, the communication unit 68 and the processing circuit 60*a* have substantially the same configuration as those of the registration terminal 10. Similar to the processing circuit 10*a* of the registration terminal 10, the processing circuit 60*a* includes a processor 61, a RAM 62, a storage unit 63, an input/output interface, and a bus connecting these, and functions as a computer that performs calculation processing. The storage unit 63 stores an application program related to authentication of the target code CDs (hereinafter, a code authentication application).

The code authentication application, similar to the information registration application, is provided by a system administrator or a system vendor, and the like, and is installed in the verification terminal 60. When the processor 61 executes the code authentication application, a code verification process (see FIG. 7) starts. In the processing circuit 60*a*, an image acquisition unit 71, a code reading unit 72, a feature extraction unit 73, a registration feature preparation unit 74, a code determination unit 75, and the like are established as functional units for performing the code verification process in cooperation with the data provision unit 42.

The image acquisition unit 71, the code reading unit 72 and the feature extraction unit 73 have substantially the same functions as the image acquisition unit 21, the code reading unit 22 and the feature extraction unit 23 established in the registration terminal 10. The image acquisition unit 71 acquires a code image PiC (see FIG. 4) acquired by photographing a target code CDs as the authentication target from the camera 66 (at S101). Upon start of the code verification process, the reading screen RS (see FIG. 4) is also displayed on the display 67 of the verification terminal 60. When the photographer holding the verification terminal 60 places the target code CDs within the frame image GF, a code image PiC including the target code CDs is stored.

The image acquisition unit 71 searches for each finder pattern from the captured code image PiC, and identifies the position, the rotation angle, and the like of the target code CDs shown in the code image PiC (at S102). Furthermore, the image acquisition unit 71 applies the pre-processing to the area in which the target code CDs is shown (at S103) and generates an extraction image. The contents of the pre-processing (such as normalization, standardization, and the like) applied to the target code CDs are substantially the same as the contents of the pre-processing applied to the master code CDr in the registration terminal 10. Therefore, an extraction image corrected to the same photographing condition as the extraction image used to extract the registration image feature in the registration terminal 10 is prepared by the image acquisition unit 71.

The code reading unit 72 reads out information stored in the target code CDs from the code image PiC in which the target code CDs is shown or from the extraction image. The code reading unit 72 acquires at least the identification information of the target code CDs (at S104). When the area information is written in the data area AD, the code reading unit 72 acquires the area information from the target code CDs.

The identification information read by the code reading unit 72 is transmitted together with the request for provision from the communication unit 68 to the authentication server 30 (at S105). The communication unit 68 may transmit the provision request to a predetermined authentication server 30, or may select an authentication server 30 to which the provision request is to be transmitted based on the information stored in the target code CDs.

The feature extraction unit 73 sets an extraction area AE within the area of the target code CDs shown in the code image PiC based on the area information (at S106). The feature extraction unit 73 may use the area information read from the target code CDs, or may use the area information received from the authentication server 30. Furthermore, the feature extraction unit 73 may set a predefined range as the extraction area AE. The range of the extraction area AE set for the target code CDs by the feature extraction unit 73 is substantially the same as the range of the extraction area AE set for the master code CDr. That is, the feature extraction unit 73 sets a band shaped region that is a half of one side of the target code CDs and that is disposed along the boundary between the black cells CeB and the white cells CeW as the extraction area AE (see FIGS. 2 and 3).

The feature extraction unit 73 extracts the image feature from the set extraction area AE and acquires the image feature as the extraction image feature (at S107). The contents of the image feature extraction process applied to the target code CDs are substantially the same as the contents of the image feature extraction process applied to the master code CDr in the registration terminal 10. That is, if the target code CDs is the same individual as the master code CDr, the feature point Pf is set at approximately the same position as the registration image feature (see FIGS. 2, 3 and 5). The feature extraction unit 73 sets the arrangement of a large number of feature points Pf set on the boundary between the black cells CeB and the white cells CeW and the like as an extraction image feature extracted from the target code CDs.

The registration feature preparation unit 74 acquires the registration image feature provided from the data provision unit 42 in response to a provision request. The registration feature preparation unit 74 prepares the registration image feature linked to the identification information of the target code CDs as a verification target to be compared with the extraction image feature (at S108). As described above, when multiple master codes CDr exist and multiple extraction image features are associated with one piece of identification information, the registration feature preparation unit 74 prepares the multiple extraction image features as verification targets.

The code determination unit 75 verifies the extraction image feature extracted from the extraction area AE of the target code CDs by the feature extraction unit 73 with the registration image feature of the master code CDr prepared by the registration feature preparation unit 74. The code determination unit 75 determines the authenticity of the target code CDs as the authentication target based on the result of the verification (at S109).

Figure 5:
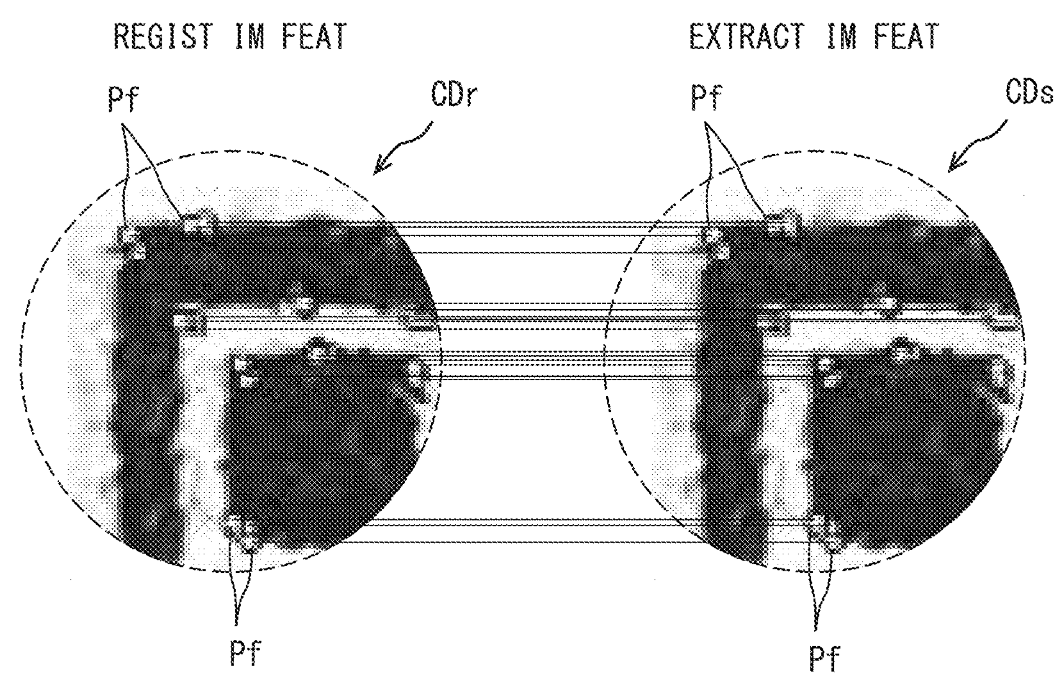
FIG. 5 is a diagram conceptually illustrating an example of a process for verifying the image feature.

Specifically, the code determination unit 75 compares the feature point Pf of the extraction image feature with the feature point Pf of the registration image feature, and specifies a pair of the feature points Pf that are located at the same position in each image feature (see FIG. 5). The code determination unit 75 determines that these image features match when the number of pairs of the feature points Pf that generally match is equal to or greater than a predetermined number or equal to or greater than a predetermined ratio. A state that the feature points Pf generally match indicates that the feature point Pf of the extraction image feature is disposed within a specific threshold range with a center of the feature point Pf of the registration image feature. If the image features match each other, the code determination unit 75 determines that the target code CDs is a genuine code CD. Here, when multiple registration image features are prepared, the code determination unit 75 selects one of the registration image features having a highest degree of match with the feature point Pf, and performs a verification between the selected registration image feature and the extraction image feature.

The result of the authenticity determination by the code determination unit 75 is presented to the end user or the like by being displayed on the display 67 (at S110). In addition, the result of the authenticity determination may be transmitted from the communication unit 68 to the authentication server 30. When the authenticity determination indicates that the target code CDs shows a copy product, the result of the authenticity determination provides a notification indicating the discovery of a copy product.

Summary of First Embodiment

In the first embodiment described above, the extraction area AE from which the image feature is extracted is set within the area of the code CD shown in the code image PiC. In addition, the code CD has a shape to be suitable for an application of the pre-processing, for example by including a straight section and a right angle corner. According to the above, it becomes easier to correctly extract the image feature from each code image PIC of the authentication target and the genuine product, so that the accuracy of authenticity determination can be ensured.

More specifically, since the extraction area AE is set within the area of the code CD, the extraction area AE appears large in the code image PiC. Hence, a high resolution image of the extraction area is acquired. In addition, since the shape and the color of the pattern included in the code CD are predetermined, even if the photographing conditions of the images of the authentication target and the genuine product are different, the extraction images of the authentication target and the genuine product after applying the pre-processing can be roughly in the same state. According to the above, if the target code CDs is the same individual as the master code CDr, the same feature point Pf can be extracted from each extraction image of the authentication target and the genuine product. Therefore, the accuracy of authenticity determination can be ensured.

In addition, in the first embodiment, since the extraction area AE is set within the area of the code CD, even if the registration terminal 10 and the verification terminal 60 are held by the operator or the user, the extraction area AE can be accurately photographed without being cut off from the code image PiC. In other words, the operator or the user can specify the extraction area AE to be used for authentication.

In addition, in the first embodiment, since a frame image GF is displayed on the reading screen RS, it is possible to unify the photographing distance according to the size of the code CD even when the registration terminal 10 and the verification terminal 60 are held in the hands. According to the above, a high-resolution image of the extraction area AE can be acquired, so that the accuracy of the authenticity determination can be more easily ensured.

Furthermore, in the first embodiment, by photographing the code CD, not only the image feature is extracted but also the identification information of the code CD is read. In addition, the image feature extracted from the master code CDr is registered in advance in the feature DB 40 in association with the identification information for identifying the code CD. Therefore, when authenticating a target code CDs, the identification information of the target code CDs can be used to quickly identify and prepare the registration image feature for the verification. As a result, the authentication of the target code CDs can be performed at high speed.

In the first embodiment, the extraction area AE is set so as to include at least one fixed pattern KP provided on the code CD. Then, the extraction image feature of the fixed pattern KP are acquired. As described above, by including a fixed pattern KP whose shape is fixed in the extraction area AE, it becomes easier to perform the image processing to bring the state of the code image PiC from which the extraction image feature is extracted closer to the state of the code image PiC used to extract the registration image feature. Specifically, it becomes possible to correct the shape of the extraction area AE of the code image PiC on which the target code CDs is shown to generally match the shape of the extraction area AE of the code image PiC on which the master code CDr is shown. As a result, the accuracy of authenticity determination can be further ensured.

Furthermore, in the first embodiment, the extraction area AE is set so as to include at least a part of the data area AD in which the data is stored. Then, the extraction image feature of the data area AD is acquired. As described above, by using the data area AD as the extraction area AE, the image feature can be extracted from a wide range within the area of the code CD. As a result, even if the target code CDs is partially missing, the authenticity can be determined by verifying the image feature of the range excluding the missing portion.

Additionally, in the first embodiment, the black cells CeB in the extraction area AE are used as the extraction target for the image feature. Therefore, even in a case where it is difficult to extract a feature from the base surface on which the code CD is formed, such as when the code CD is printed on coated paper, it is possible to set the image feature with the black cells CeB as a target. As a result, a decrease in the accuracy of the authenticity determination is suppressed.

In the first embodiment, the outer portion BP of the formation range of the black cell CeB facing the white cell CeW is set as the extraction target. On the other hand, the inner portion AX of the formation range of the black cell CeB excluding the outer portion BP is excluded from the extraction area AE. As described above, the feature points Pf is set mainly on the boundary between the black cells CeB and the white cells CeW. Therefore, by excluding the inner portion AX from the extraction area AE, it is possible to narrow the extraction area AE without reducing the accuracy of verification. As a result, the accuracy of authenticity determination can be ensured while speeding up the determination process.

In the first embodiment, the white cell CeW corresponds to a "light color cell", the black cell CeB corresponds to a "dark color cell", the verification terminal 60 corresponds to a "processing device", and the code authentication application corresponds to a "code authentication program".

Second Embodiment

Figure 8:
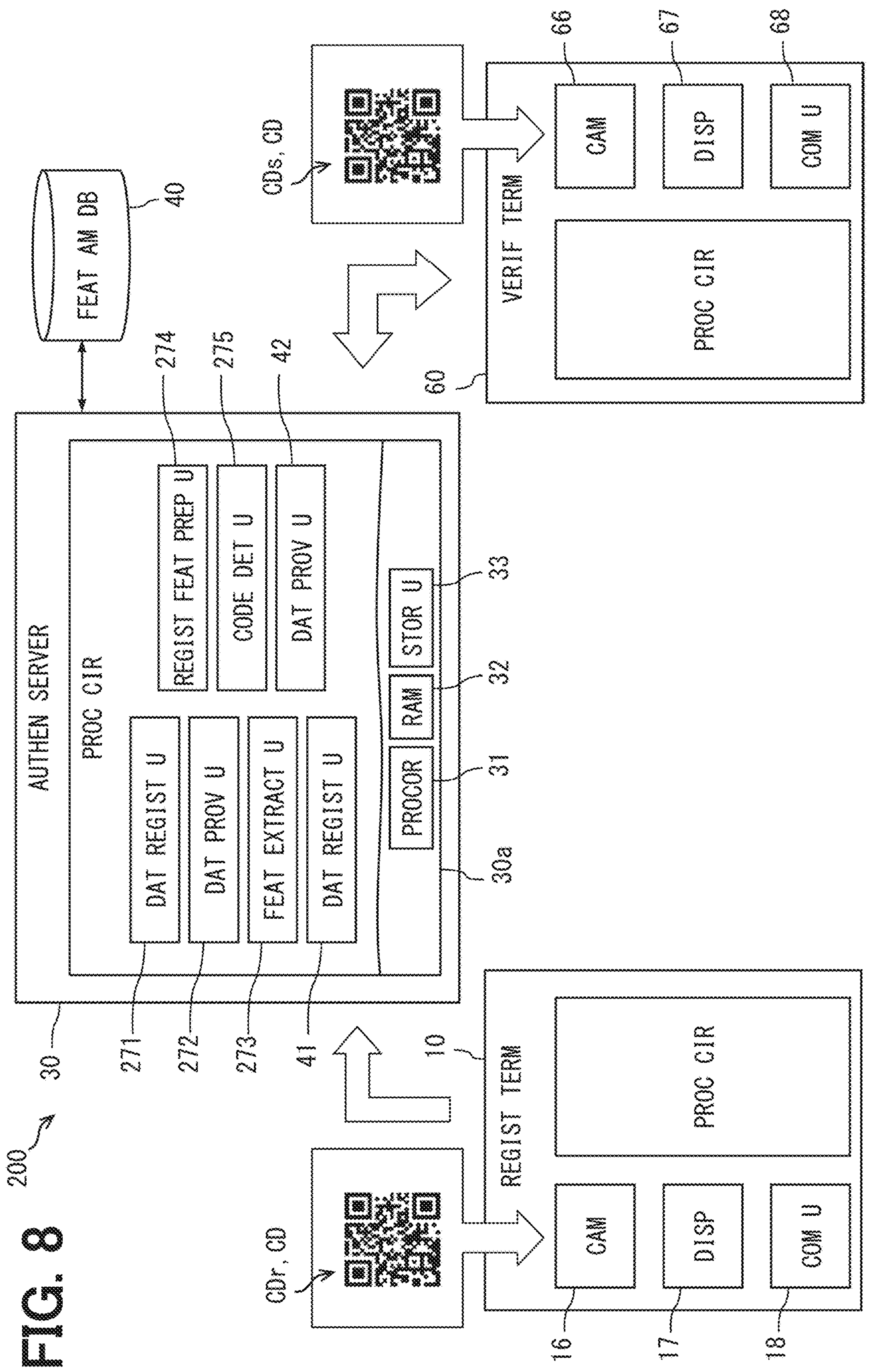
FIG. 8 is a diagram showing an overall view of a code authentication system according to a second embodiment.

In the code authentication system 200 according to the second embodiment of the present disclosure shown in FIG. 8, the function of extracting the image feature and the function of verifying the image feature are integrated in the authentication server 30. Therefore, the functional units for the edge processing provided in the registration terminal 10 and the verification terminal 60 in the first embodiment are omitted in the second embodiment. As a result, the registration terminal 10 is configured to transmit the code image PIC of the master code CDr photographed by the camera 16 to the authentication server 30 together with a registration request. The verification terminal 60 is configured to transmit a code image PIC of the target code CDs photographed by the camera 66 to the authentication server 30 together with a verification request, and to presents the verification result by the authentication server 30 to the user by displaying the verification result on the display 67.

On the other hand, the processing circuit 30*a* of the authentication server 30 includes, in addition to the data registration unit 41 and the data provision unit 42, an image acquisition unit 271, a code reading unit 272, a feature extraction unit 273, a registration feature preparation unit 274, and a code determination unit 275. These functional units are constructed based on the execution of a code authentication program by the processor 31, and have substantially the same functions as the image acquisition units 21, 71, the code reading units 22, 72, the feature extraction units 23, 73, the registration feature preparation unit 74, and the code determination unit 75 of the first embodiment. Using these functional units, the authentication server 30 performs the feature registration process (see FIG. 6) and the code verification process (see FIG. 7) similar to those in the first embodiment. Hereinafter, the details of the feature registration process and the code verification process of the second embodiment will be described based on FIGS. 6 and 7, and with reference to FIG. 8.

Figure 6:
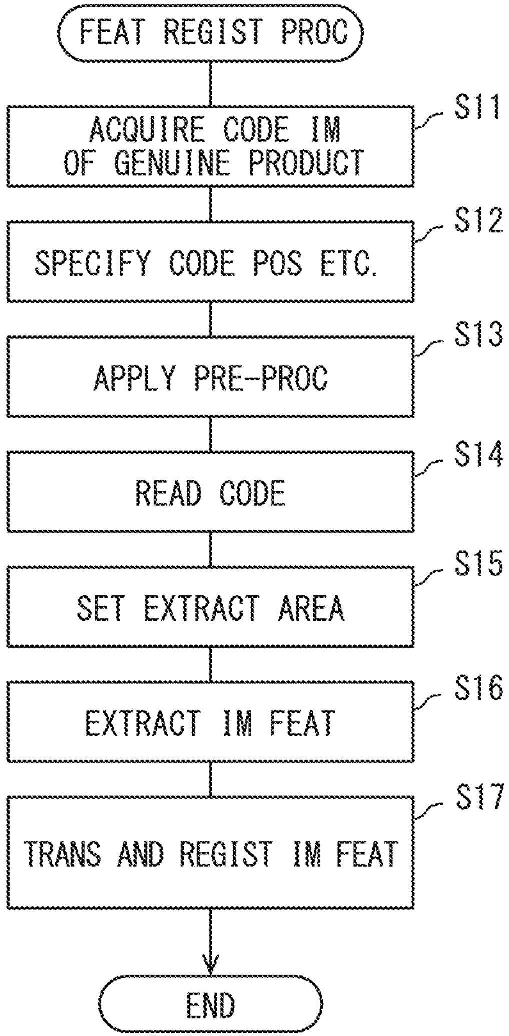
FIG. 6 is a flowchart showing details of a feature registration process.

The feature registration process shown in FIG. 6 is started upon receipt of a registration request from the registration terminal 10. In the feature registration process, the image acquisition unit 271 acquires a code image PiC acquired by photographing the master code CDr by receiving the code image PiC from the registration terminal 10 (at S11). The image acquisition unit 271 searches for each finder pattern from the code image PiC and specifies the position of the master code CDr (at S12). Furthermore, the image acquisition unit 271 prepares an extraction image by applying the pre-processing to the code image PiC (at S13).

The code reading unit 272 reads out the information stored in the master code CDr (at S14) and acquires at least the identification information of the master code CDr. Furthermore, the feature extraction unit 273 sets an extraction area AE within the region of the master code CDr (at S15). The feature extraction unit 273 sets the entire area of the code CD as an extraction area AE. The feature extraction unit 273 uses the black cell CeB as an extraction target for extracting the image feature, as in the first embodiment, but does not perform a process of excluding the inner portion AX from the extraction area AE. The feature extraction unit 273 extracts the image feature from an extraction area AE set over the entire code CD, and acquires the image feature as the registration image feature (at S16). The registration image feature acquired by the feature extraction unit 273 is registered in the feature amount DB 40 by the data registration unit 41 together with the identification information read by the code reading unit 272 (at S17). In the second embodiment, the entire area of the code CD is uniformly set as the extraction area AE, so that generation and registration of the area information is omitted.

Figure 7:
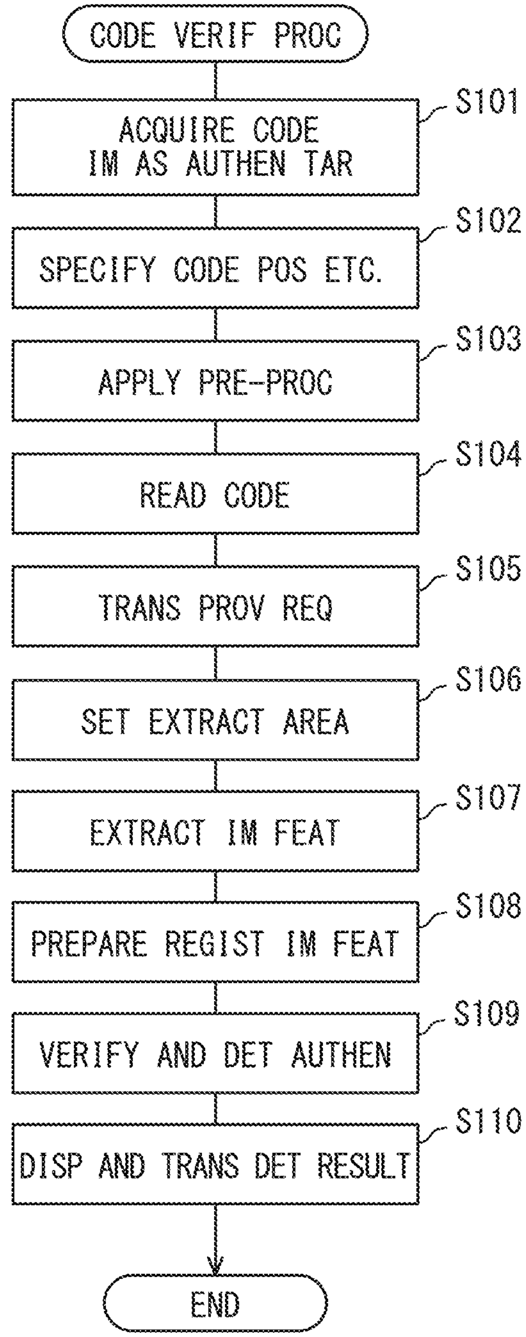
FIG. 7 is a flowchart showing details of a code verification process.

The code verification process shown in FIG. 7 is started upon receipt of a verification request from the verification terminal 60. In the code verification process, the image acquisition unit 271 acquires a code image PiC acquired by photographing a target code CDs by receiving the code image PiC from the verification terminal 60 (at S101). The image acquisition unit 271 searches for each finder pattern from the code image PiC and specifies the position of the target code CDs (at S102). Furthermore, the image acquisition unit 271 applies the pre-processing applied to the code image PiC showing the master code CDr to the code image PiC showing the target code CDs, to prepare an extraction image (at S103).

The code reading unit 272 reads out the information stored in the target code CDs (at S104) and acquires at least the identification information of the target code CDs. In the second embodiment, the process of transmitting the provision request together with the identification information (at S105) is omitted.

The feature extraction unit 273 sets the entire area of the target chord CDs as an extraction area AE (at S106). The feature extraction unit 273 also applies the extraction process for the image feature applied to the master code CDr to the target code CDs, and extracts the image feature from the black cells CeB in the extraction area AE. The feature extraction unit 273 acquires the image feature extracted from the target code CDs as the extraction image feature (at S107).

The registration feature preparation unit 274 searches for the registration image feature associated with the identification information from among a large number of registration image features preliminarily registered in the feature amount DB 40 in response to the identification information acquired by the code reading unit 272 as a trigger. The registration feature preparation unit 74 prepares the registration image feature specified by the search as verification target to be compared with the extraction image feature (at S108). The code determination unit 275 compares the extraction image feature extracted from the extraction area AE of the target code CDs with the registration image feature of the master code CDr, and determines the authenticity of the target code CDs as the authentication target (at S109).

The data provision unit 42 transmits the result of the authenticity determination of the target code CDs to the verification terminal 60 which is the transmission source of the verification request (at S110). Based on the determination result received from the authentication server 30, the verification terminal 60 causes the display 67 to display a notice indicating the authenticity of the target code CDs.

The second embodiment described so far also has the same effects as the first embodiment, so that it is possible to ensure the accuracy of the authenticity determination and to speed up the process of determining the authenticity. In the second embodiment, the authentication server 30 corresponds to the "processing device."

Third Embodiment

The third embodiment of the present disclosure is a modified example of the first embodiment. In the feature registration process (see FIG. 6) and the code verification process (see FIG. 7) of the third embodiment, the process of reading out the information stored on the code CD (S14, S104) is omitted. In addition, the extraction area AE is set within the region of the code CD only in the range in which the fixed pattern KP is formed (at S15 and S106). Specifically, the formation range of the finder pattern common to each code CD is set as an extraction area AE by each feature extraction unit 23, 73. Each of the feature extraction units 23 and 73 sets both the black cells CeB and the white cells CeW that form the finder pattern as extraction targets for extracting the image feature.

Furthermore, in the feature registration process, the registration terminal 10 transmits the image feature of the finder pattern extracted from the master code CDr together with the registration request to the authentication server 30 (at S17). The data registration unit 41 accumulates the image feature of the finder pattern in the feature amount DB 40 as the registration image feature. As described above, since the reading of the identification information is omitted, the registration image feature is accumulated in the feature amount DB 40 without being linked to the identification information.

A large number of registration image features stored in the feature amount DB 40 are provided to each verification terminal 60 at a predetermined cycle by a data provision unit 42. Therefore, in the verification terminal 60, a state in which a large number of registration image features are stored in the storage unit 63 is maintained. As described above, in the code verification process, the registration feature preparation unit 74 searches for the registration image feature that is most similar to the extraction image feature extracted from the finder pattern of the target code CDs from among the multiple registration image features stored in the storage unit 63 (at S108). The code determination unit 75 verifies the registration image feature searched by the registration feature preparation unit 74 with the extraction image feature of the finder pattern of the target code CDs, and determines the authenticity of the target code CDs (at S109).

The third embodiment described so far also has the same effects as the first embodiment, so that it is possible to ensure the accuracy of the authenticity determination and to speed up the process of determining the authenticity. More specifically, in the third embodiment, the formation range of the fixed pattern KP that is common to each code CD is set in the extraction area AE. In this way, if the same area in the code CD is always set as the extraction area AE, the step of setting the extraction area AE becomes unnecessary in the feature registration process and the code verification process. Therefore, each process can be performed at high speed.

In addition, by limiting the extraction area AE to the range in which the fixed pattern KP is formed, it is possible to narrow the area of the extraction area AE smaller than in a feature in which the data area AD is included in the extraction area AE. As a result, the step of extracting the image feature and therefore each process can be sped up.

Furthermore, in the third embodiment, the registration image feature as the verification target can be specified from among a large number of registration image features stored in advance without using the identification information. Therefore, the reading of the target code CDs becomes unnecessary, and the code verification process can be performed at high speed. Furthermore, even if the information of the target code CDs is significantly lost and the identification information cannot be read correctly, the verification terminal 60 can still determine the authenticity of the target code CDs.

Other Embodiments

Although multiple embodiments according to the present disclosure have been described above, the present disclosure is not construed as being limited to the above-mentioned embodiments, and can be applied to various embodiments and combinations within a scope not departing from the spirit of the present disclosure.

In the first modification of the first embodiment, each of the feature extraction units 23 and 73 uses only the white cells CeW among the white cells CeW and the black cells CeB in the extraction area AE as an extraction target for extracting the image feature. According to the first modification, even if the ink used to print the code CD is, for example, an evaporative or penetrating type, and the state of the black cell CeB is easily to change over time, it is possible to suppress a decrease in the accuracy of the authenticity determination.

In the first embodiment, a half of the range of the code CD is set as the extraction area AE, and in the second embodiment, the entire code CD is set as the extraction area AE. Furthermore, in the third embodiment, only the formation range of the fixed pattern KP is set as the extraction area AE. As described above, a part of the formation range of the code CD that is set as the extraction area AE may be changed as appropriate. For example, in the second modification of the above embodiment, the extraction area AE is set only in the data area AD. Furthermore, in the third modification of the third embodiment, an extraction area AE is set in the range in which the fixed pattern KP other than the finder pattern, specifically, the alignment pattern, the timing pattern and the margin area are formed.

In the above embodiment, an individual authentication technique is used for verifying the image feature using the feature point Pf extracted from an extraction area AE. The method used to verify the image feature may be modified as appropriate. For example, a determination device generated using the machine learning may be used to perform the verification of the image feature of the target code CDs with the image feature of the master code CDr.

In the above embodiment, a case has been described in which the code authentication method according to the present disclosure is applied to determining the authenticity of a QR code. Alternatively, the code authentication method according to the present disclosure can also be applied to authentication of one-dimensional or two-dimensional codes other than the QR code. For example, the one-dimensional code (i.e., the bar code) such as JAN, CODE39, and CODE128 may be the code CD as the authentication target. Furthermore, the two-dimensional code such as DataMatrix, VeriCode, MaxiCode, and PDF417 may be used as the code CD for authentication.

In the first embodiment, the feature registration process and the code verification process are performed by the registration terminal 10 and the verification terminal 60, which are on the edge side, respectively. On the other hand, in the second embodiment, the authentication server 30 performs the feature registration process and the code verification process. As described above, the processing device that performs the feature registration process and the code verification process may be changed as appropriate in the code authentication system.

For example, the feature registration process may be performed in the registration terminal 10 and the code verification process may be performed in the authentication server 30, or the feature registration process may be performed in the authentication server 30 and the code verification process may be performed in the verification terminal 60. Furthermore, some steps of the feature registration process may be performed by the registration terminal 10, and the remaining steps may be performed by the authentication server 30. Similarly, some steps of the code verification process may be performed by the verification terminal 60 and the remaining steps may be performed by the authentication server 30.

In the above embodiments, each function provided by the registration terminal 10, the authentication server 30 and the verification terminal 60 can be provided by software and hardware that executes the software, only software, only hardware, or a complex combination thereof. When these functions are provided by electronic circuits as hardware, each function can also be provided by digital circuits that include a large number of logic circuits, or by analog circuits.

Each processor 11, 31, 61 in the above embodiments may include at least one arithmetic core such as a central processing unit (i.e., CPU) and a graphics processing unit (i.e., GPU). The processor may further include a field-programmable gate array (i.e., FPGA), a neural network processing unit (i.e., NPU), an IP core with other dedicated functions, and the like.

The feature of the storage medium (i.e., non-transitory tangible storage medium) employed as each storage unit of the above embodiments and storing each program related to the code verification method of the present disclosure may be changed as appropriate. For example, the storage medium is not limited to the configuration provided on the circuit board, and may be provided in the form of a memory card or the like. The storage medium may be inserted into a slot unit, and electrically connected to each processing circuit. The storage medium may include an optical disk which is a copy source or a distribution source of a program and a hard disk drive therefor, and the like.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A code authentication system comprising:

an image acquisition unit that acquires a code image acquired by photographing a QR code as an authentication target;

a feature extraction unit that sets an extraction area within an area of the QR code shown in the code image and acquires an image feature extracted from the extraction area as an extraction image feature, the image feature including a surface pattern and small irregularity of the extraction area as a feature point;

a registration feature preparation unit that prepares the image feature extracted from the extraction area of the QR code which is a genuine product and registered in advance as a registration image feature;

a code determination unit that determines an authenticity of the QR code as the authentication target based on a verification between the extraction image feature and the registration image feature, the code determination unit verifying the extraction image feature of the authentication target product with the registration image feature of the genuine product to determine whether the authentication target product is the genuine product; and at least one of (i) a circuit and (ii) a processor coupled to a memory storing computer program code, wherein:

the at least one of the circuit and the processor coupled to the memory is configured to cause the code authentication system to provide at least one of: the image acquisition unit; the feature extraction unit; the registration feature preparation unit; and the code determination unit, wherein the extraction image feature of the authentication target product with the registration image feature of the genuine product is extracted with a predetermined accuracy or more to ensure a predetermined accuracy of authenticity determination of the authentication target product, wherein the code determination unit compares the feature point of the extraction image feature with the feature point of the registration image feature, specifies a pair of the feature points that are located at a same position in each of the extraction image feature and the registration image feature, and determines that the extraction image feature and the registration image feature match when a numerical number of pairs of the feature points that generally match is equal to or greater than a predetermined number or equal to or greater than a predetermined ratio, and wherein a state that the feature points generally match indicates that the feature point of the extraction image feature is disposed within a specific threshold range with a center of the feature point of the registration image feature.

2. The code authentication system according to claim 1, wherein:

the feature extraction unit sets the extraction area to include at least one fixed pattern provided in the QR code, and acquires the extraction image feature of the fixed pattern.

3. The code authentication system according to claim 1, wherein:

the feature extraction unit sets the extraction area to include at least a part of a data area of the QR code in which data is stored, and acquires the extraction image feature of the data area.

4. The code authentication system according to claim 1, wherein:

the code includes a light color cell and a dark color cell; and the feature extraction unit uses the light color cell in the extraction area as an extraction target of the image feature.

5. The code authentication system according to claim 1, wherein:

the QR code includes a light color cell and a dark color cell; and the feature extraction unit uses the dark color cell in the extraction area as an extraction target of the image feature.

6. The code authentication system according to claim 5, wherein:

the feature extraction unit is configured to:

set an outer portion of a formation area of the dark color cell facing the light color cell as the extraction target; and exclude an inner portion of the formation area of the dark color cell other than the outer portion from the extraction area.

7. A non-transitory computer readable storage medium comprising instructions being executed by a computer, the instructions including a computer-implemented method, the instructions including:

acquiring a code image acquired by photographing a QR code as an authentication target;

setting an extraction area within an area of the QR code shown in the code image;

acquiring an image feature extracted from the extraction area as an extraction image feature, the image feature including a surface pattern and small irregularity of the extraction area as a feature point;

preparing the image feature extracted from the extraction area of the QR code which is a genuine product and registered in advance as a registration image feature; and determining an authenticity of the QR code as the authentication target based on a verification between the extraction image feature and the registration image feature, the determining including verifying the extraction image feature of the authentication target product with the registration image feature of the genuine product to determine whether the authentication target product is the genuine product, wherein the extraction image feature of the authentication target product with the registration image feature of the genuine product is extracted with a predetermined accuracy or more to ensure a predetermined accuracy of authenticity determination of the authentication target product, wherein the determining includes comparing the feature point of the extraction image feature with the feature point of the registration image feature, specifying a pair of the feature points that are located at a same position in each of the extraction image feature and the registration image feature, and determining that the extraction image feature and the registration image feature match when a numerical number of pairs of the feature points that generally match is equal to or greater than a predetermined number or equal to or greater than a predetermined ratio, and wherein a state that the feature points generally match indicates that the feature point of the extraction image feature is disposed within a specific threshold range with a center of the feature point of the registration image feature.

8. A code verification system comprising:

at least one of (i) a circuit and (ii) a processor coupled to a memory storing computer program code, wherein:

the at least one of the circuit and the processor coupled to the memory is configured to cause the code verification system to:

acquire a code image acquired by photographing a QR code as an authentication target;

set an extraction area within an area of the QR code shown in the code image;

acquire an image feature extracted from the extraction area as an extraction image feature, the image feature including a surface pattern and small irregularity of the extraction area as a feature point;

prepare the image feature extracted from the extraction area of the QR code which is a genuine product and registered in advance as a registration image feature; and determine an authenticity of the QR code as the authentication target based on a verification between the extraction image feature and the registration image feature, the determining including verifying the extraction image feature of the authentication target product with the registration image feature of the genuine product to determine whether the authentication target product is the genuine product, wherein the extraction image feature of the authentication target product with the registration image feature of the genuine product is extracted with a predetermined accuracy or more to ensure a predetermined accuracy of authenticity determination of the authentication target product, wherein the determining includes comparing the feature point of the extraction image feature with the feature point of the registration image feature, specifying a pair of the feature points that are located at a same position in each of the extraction image feature and the registration image feature, and determining that the extraction image feature and the registration image feature match when a numerical number of pairs of the feature points that generally match is equal to or greater than a predetermined number or equal to or greater than a predetermined ratio, and wherein a state that the feature points generally match indicates that the feature point of the extraction image feature is disposed within a specific threshold range with a center of the feature point of the registration image feature.

* * * * *